United States Patent Office 3,325,442
Patented June 13, 1967

3,325,442
PREPARATION OF POLYETHYLENE COMPOSITIONS CONTAINING CARBON BLACK AND PEROXIDE CURING AGENT
Robert J. McManimie, St. Louis County, Mo., assignor to Monsanto Company, St. Louis, Mo., a corporation of Delaware
No Drawing. Filed Mar. 25, 1963, Ser. No. 267,789
9 Claims. (Cl. 260—41)

The present invention concerns the preparation and molding of carbon black-filled polyethylene powders containing crosslinking agents. The invention is particularly concerned with the Ziegler polymerization of ethylene in the presence of carbon black, followed by addition of peroxide curing agents and drying to obtain a filled and crosslinkable polymer powder in which the polyethylene, carbon black and peroxide are in intimate admixture and can be molded without any intermediate mechanical mastication. The invention is further concerned with the particulated polyethylene containing carbon black intimately blended therein and also containing peroxide.

It has previously been known that fillers such as carbon black can cause considerable change in the properties of a base polymer. Small particle size carbon blacks in amounts of 2 to 3% impart outdoor aging resistance but larger amounts yield a stiff, brittle polymer that will not draw and which becomes excessively brittle at even moderately low temperatures. It has also previously been known that milling in peroxides and then curing at elevated temperatures makes it possible to have higher loadings of carbon black without deterioration of physical properties. In such a procedure, control of the temperature at which the carbon black and peroxide are milled with the polymer must be very good to prevent premature curing.

By the present invention, the need for any milling or other mastication step is eliminated and the possibility of premature curing during such step is thereby avoided, along with the expense of such step.

According to the present invention ethylene is polymerized in the presence of a filler using a Ziegler catalyst and peroxide crosslinking agents are incorporated into the filled polyethylene particles. The peroxides can be added to the polymer slurry after the polymerization and be absorbed therefrom by the carbon-black-containing polymer particles; or the peroxides can conveniently be added to the polyethylene particles after filtration, countercurrent washing or other isolation or purification steps but prior to drying the solvent therefrom. The peroxides can also be added to the dried carbon-black-containing polyethylene powder isolated from the polymerization. Or, if desired, the peroxides can be present during the polymerization, although this is undesirable as the peroxides tend to interact with the catalyst components. In all of the foregoing procedures, the peroxides are readily formed into an intimate admixture with the filled polyethylene, making any subsequent mastication or milling procedures unnecessary. The filled polyethylene powder containing peroxides can then be directly molded by filling a mold with the powder and applying heat. In such a procedure the powder conforms to the desired shape of the finished, molded article and there is no mechanical working either in the molding itself or prior to entering the mold to blend in the peroxides. However, the peroxide and carbon-black-containing polyethylene powders can be molded by extrusion or injection molding procedures, provided that the temperature in the extrusion or injection step is not permitted to become too high and cause premature curing. But the powders of the present invention are particularly suitable for direct, powder molding procedures.

In the present invention the peroxide or other crosslinking agent is conveniently added to the polyethylene in the form of a solution in a hydrocarbon or other solvent, e.g., n-pentane. Various other solvents can be employed, e.g., lower hydrocarbon or other volatile solvents, e.g., iso-pentanes, hexane, acetone, etc.

The peroxides are readily incorporated in the powdered polyethylene without the necessity for any milling or other mechanical working or fusion processes. But to avoid working it is essential that the polyethylene be in particulated form for the peroxide addition; peroxides cannot be effectively incorporated without mechanical working into carbon-black-filled polyethylene in the slab or sheet form resulting from milling carbon black into polyethylene. In addition, the mechanical milling of the carbon black does not ordinarily produce as intimate an admixture of the carbon black and polyethylene as does the polymerization procedure taught herein.

The present procedure makes it possible to obtain fairly high loadings of carbon black without excessive stiffening or brittleness of the polymer, for example, the carbon black constituting from 10 to 30 or 40% or more by weight of the filled polyethylene composition.

The polyethylene resulting from the polymerization herein is ordinarily fairly high density polyethylene, having a density in excess of 0.925, and of varying particle size, but ordinarily of relatively small particle size, as produced in the polymerization. Any of the usual carbon black fillers can be employed, including thermal, furnace and channel carbon blacks.

The carbon-black-filled polyethylene and peroxide mixtures are conveniently molded and cured, i.e., crosslinked, by compression molding or the like. The basic procedure is to place the powdered composition in the mold cavity, close the mold and then apply heat and pressure (through a moving force plug) for the proper time and temperature. The molding is generally carried out at about 260 to 450° F., often 300° to 350° F., and for less than about 1 minute to 30 or 60 minutes or more. The amount of peroxide curing agent will generally be less than 5% by weight of the filled polyethylene composition e.g., about 0.5 to 3% by weight.

The crosslinking agents utilized herein are the "peroxides" (i.e., compounds containing 2 oxygen atoms which are singly linked). Included herein are the simple peroxides, R—O—O—R; peroxides in which the 2 radicals are different, R—O—O—R'; the hydroperoxides

R—O—O—H the peracids,

compounds of the types

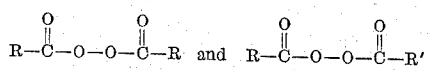

the peresters,

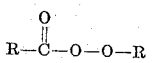

and

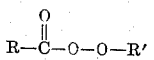

etc., where "R" and "R" are alkyl, cyclo-alkyl, aryl, or arylalkyl radicals which may in turn be substituted with other substituents.

Some suitable peroxides are listed below along with their half-lives in benzene: t-butyl peroxyisobutyrate ($t\frac{1}{2}$=0.55 hr. at 100° C.); benzoyl peroxide ($t\frac{1}{2}$=0.40 hr. at 100° C.); p-chlorobenzoyl peroxide ($t\frac{1}{2}$=0.5 hr.

at 100° C.); hydroxyheptyl peroxide ($t\frac{1}{2}=1.19$ hrs. at 115° C.); cyclohexanone peroxide ($t\frac{1}{2}=1.01$ hrs. at 115° C.); di-t-butyl diperphthalate ($t\frac{1}{2}=0.40$ hr. at 130° C.); t-butyl peracetate ($t\frac{1}{2}=0.34$ hr. at 130° C.); t-butyl perbenzoate ($t\frac{1}{2}=3.1$ hrs. at 115° C.); dicumyl peroxide ($t\frac{1}{2}=0.28$ hr. at 145° C.); methyl ethyl ketone peroxide ($t\frac{1}{2}=0.25$ hr. at 145° C.); di-t-butyl peroxide ($t\frac{1}{2}=6.4$ hrs. at 130° C.); p-menthane hydroperoxide ($t\frac{1}{2}=0.93$ hr. at 160° C.); cumene hydroperoxide ($t\frac{1}{2}=29.0$ hrs. at 145° C.); 2,5 - dimethyl - 2,5-di(t-butylperoxy)hexane ($t\frac{1}{2}=2.8$ hrs. at 130° C.); 2,5-dimethyl-2,5-di-(peroxybenzoate)hexane ($t\frac{1}{2}=1.54$ hrs. at 115° C.); benzoyl peroxide ($t\frac{1}{2}=0.33$ hr. at 100° C.); succinic acid peroxide ($t\frac{1}{2}=0.44$ hr. at 100° C.); etc.

The invention is illustrated by the following examples.

Lampblack (Eagle Brand Germantown Lampblack), 22 grams dried and deaerated in vacuum for 72 hours and held under nitrogen was added to a nitrogen flushed reactor. One liter of hexane was added, stirring was started and 1.1 cc. (10 mmoles) of TiCl₄ was added. After aging for 5 minutes at 60° C., 0.915 cc. (5 mmoles) AlH(isobutyl)₂ was added. After 1 minute, a flow of ethylene was started and maintained for 75 minutes. The polymerization mixture was then treated with 200 ml. isopropanol, cooled to 30° C., and filtered. The polymer composition was washed with additional isopropanol, slurried and refluxed in additional isopropanol, filtered and dried in a vacuum oven. The particulate polyethylene composition weighed 102 grams and contained 21.6% by weight carbon black. A 15 gram portion of the particulate polyethylene was treated with 30 ml. of a 0.01 gram/ml. solution of dicumyl peroxide (an 80% purity dicumyl peroxide sold under the name, Dicup-T) in pentane, the pentane allowed to evaporate, and the resulting mixture dried under vacuum. The composition was then pressure molded at 320° F., for 3 minutes to give a molding having a Clash-Berg 25° modulus of 130,000, and $T_f$ of 26° and Stifflex range of 101 degrees which is very similar to the 135,000, 25° and 100 degrees for an unfilled polyethylene prepared under the same polymerization conditions and molded without peroxide. In contrast to this, the polyethylene control when simply admixed with carbon black to have the same, i.e., 21.6%, carbon black and molded without peroxide, the Clash-Berg 25° modulus was 247,500 and the $T_f$ 43°, showing that the material was more stiff and brittle, and the Stifflex range was only 83 degrees. Similarly, when the carbon-black-containing polyethylene of this example was molded without peroxide, the product was more stiff and brittle than the polyethylene alone, having a Clash-Berg 25° modulus of 197,500, $T_f$ of 42°, and a Stifflex range of 84 degrees. Thus both the polymerization procedure for incorporating the carbon black and the peroxide curing are necessary to achieve the desired carbon black loadings without causing excessive brittleness and stiffness.

In the foregoing procedure the peroxide can also be added to the slurry of polymer in hexane following the polymerization, or to the polymer after the washing steps and either before or after the filtration step but prior to a drying step. In the event catalyst residues are removed by a multi-stage countercurrent extraction such as that taught in U.S. Patent No. 3,074,921 to Don E. Carter, the peroxide can conveniently be added either before or after the centrifuging or other step to separate the collected polyethylene particles from the bulk of the hydrocarbon slurrying medium. The peroxide is conveniently dissolved in an organic solvent for addition to the particulated polyethylene and this is a very suitable procedure. If the polyethylene is still slurried in or wet with the polymerization medium, however, the peroxide can be readily incorporated without the use of any additional solvent.

The Ziegler catalysts employed herein are exemplified by compositions having components of (a) organic compounds of metals represented by $R_nMeX$ in which R is hydrocarbon; Me is a 1st to 3rd group metal of the Periodic Table; X is hydrogen, hydrocarbon and halogen and $n$ is a number lower by 1 than the valence of the metal Me; and (b) a salt of a Group IV–B to VI–B metal of the Periodic Table. One of the conveniently employed groups of Ziegler catalysts is that disclosed in Belgian Patent No. 533,362, issued May 16, 1955, to Ziegler, the disclosure of which is hereby incorporated herein by reference, namely, catalysts prepared by the interaction of a trialkylaluminum with a compound of a metal of Group IV–B, V–B, or VI–B of the Periodic Table, including thorium and uranium, and especially compounds of titanium, zirconium, and chromium. These and the variety of other catalysts of the Ziegler type, can be considered exemplified by the catalysts obtained by the interaction of a trialkyl-aluminum with titanium tetrachloride. Other catalysts of the Ziegler type differ from those disclosed in the above-mentioned Belgian Patent No. 533,362, in various ways, for example, as follows. Instead of or in addition to the aluminum trialkyls, catalysts of the type described in the Belgian patent can be made by reacting the various metal compounds of Groups IV–V, V–B, and VI–B disclosed therein with aluminum compounds of the general formula RAlX₂, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, dialkyl or diaryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as C₂H₅ZnI and zinc dialkyls, all of these, of course, being reacted with compounds of Groups IV–B, V–B or VI–B metals. The atomic ratio of the 1st to 3rd group metal to the IV–B to VI–B metal is ordinarily in the range of about 0.1 to 5.0, and usually in the range of about 0.1 to 1.

It is ordinarily preferred in the present invention to utilize catalysts which would produce high bulk density polyethylene in the absence of carbon black, e.g., bulk densities in the range of 15 to 25 lbs./cu. ft. as such polyethylene powders are more readily extrudable than low bulk density polyethylene powders normally produced having bulk densities in the range of 6 to 10 lbs. cu. ft. Catalysts which give the low bulk density can be employed, however, as the low bulk density polyethylene material can still be used although feeding may be more difficult. Catalysts which produce high bulk density polyethylenes are titanium subchloride catalysts such as dialkylaluminum chloride combined with titanium trichloride, or alkyl aluminum sesquichlorides with titanium trichloride. Titanium tetrachloride reduced with aluminum can be employed as the titanium trichloride.

What is claimed is:
1. The process of preparing molded polyethylene compositions which comprises Ziegler polymerization of ethylene in the presence of Ziegler catalysts and carbon black, adding peroxide curing agent, placing the resulting particulate polyethylene containing carbon black and peroxide in a mold and heating to cure and mold same, the catalyst being composed of (a) organic compounds of metals represented by the formula $R_nMeX$ in which R is hydrocarbon; Me is a 1st to 3rd group metal; X is selected from the group consisting of hydrogen, hydrocarbon and halogen and $n$ is a number lower by 1 than the valence of the metal Me; and (b) a salt of a Group IV–B to VI–B metal.

2. The process of claim 1 in which the catalyst is an alkyl aluminum compound in combination with $TiCl_n$ where $n$ is an integer from 3 to 4.

3. The process of claim 2 in which a hydrocarbon solvent is used to incorporate the peroxide.

4. The process of claim 2 in which the peroxide is added to the particulate carbon-black containing polyethylene following the polymerization and the particulate material is then dried prior to the molding step.

5. The process of claim 2 in which the particulate carbon-black containing polyethylene is dried and the peroxide is then added.

6. The process of claim 4 in which the peroxide is dicumyl peroxide and the molding step is at about 260 to 450° F.

7. The process of claim 1 in which the catalyst is diisobutylaluminum hydride and titanium tetrachloride.

8. The process of claim 1 in which the catalyst is diisobutylaluminum chloride and titanium trichloride resulting from reduction of titanium tetrachloride with aluminum.

9. The process of claim 2 in which there is no mastication following addition of the peroxide and the composition retains its particulate character until formed into the desired shape of the final article in a mold, the carbon black constituting 10% to 40% weight of the carbon black and polyethylene.

References Cited

UNITED STATES PATENTS

| | | | |
|---|---|---|---|
| 2,888,424 | 5/1959 | Precopio et al. | 260—41 |
| 2,985,640 | 5/1961 | Loeb | 260—88.2 |
| 3,008,949 | 11/1961 | Langer et al. | 260—41 |
| 3,012,016 | 12/1961 | Kirt et al. | 260—41 |
| 3,014,885 | 12/1961 | Jordan et al. | 260—41 |
| 3,092,438 | 6/1963 | Kruger | 264—126 |

FOREIGN PATENTS 566,294  11/1957  Italy.

OTHER REFERENCES

Oleesky et al.: "S.P.I. Handbook of Reinforced Plastics," Reinhold Pub. Co., N.Y., 1964, pp. 40–41.

MORRIS LIEBMAN, *Primary Examiner.*

K. B. CLARKE, J. H. DERRINGTON,
*Assistant Examiners.*